United States Patent
Kuno et al.

(10) Patent No.: US 7,607,136 B2
(45) Date of Patent: Oct. 20, 2009

(54) METHOD AND APPARATUS FOR INTERFACING WITH A DISTRIBUTED COMPUTING SERVICE

(75) Inventors: Harumi Anne Kuno, Cupertino, CA (US); Edward P. Katz, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1055 days.

(21) Appl. No.: 10/695,461

(22) Filed: Oct. 28, 2003

(65) Prior Publication Data

US 2005/0091386 A1 Apr. 28, 2005

(51) Int. Cl.
G06F 9/44 (2006.01)
G06F 9/54 (2006.01)
(52) U.S. Cl. .................. 719/315; 719/316; 719/330
(58) Field of Classification Search .......... 719/315, 719/316, 330
See application file for complete search history.

(56) References Cited

U.S. PATENT DOCUMENTS

| | | | |
|---|---|---|---|
| 2002/0143819 A1* | 10/2002 | Han et al. | 707/513 |
| 2002/0150093 A1* | 10/2002 | Ott et al. | 370/389 |
| 2002/0188666 A1 | 12/2002 | Lemon et al. | |
| 2003/0005412 A1* | 1/2003 | Eanes | 717/120 |
| 2003/0115548 A1* | 6/2003 | Melgar | 715/513 |
| 2003/0172368 A1* | 9/2003 | Alumbaugh et al. | 717/106 |
| 2003/0177112 A1* | 9/2003 | Gardner | 707/3 |
| 2004/0054690 A1* | 3/2004 | Hillerbrand et al. | 707/104.1 |
| 2004/0162741 A1* | 8/2004 | Flaxer et al. | 705/7 |
| 2004/0193635 A1* | 9/2004 | Hsu et al. | 707/102 |
| 2004/0205101 A1* | 10/2004 | Radhakrishnan | 709/200 |

FOREIGN PATENT DOCUMENTS

WO  WO 02/073493 A1 * 9/2002

OTHER PUBLICATIONS

Sheshagiri et al., "A Planner for Composing Services Described in DAMLS," AAMAS '03 Melbourne, Australia, Jul. 14/15, 2003, 7 pages.*
M. Paolucci, K. Sycara, T. Nishimura, and N. Srinivasan, "Using DAML-S for P2P Discovery," in Proceedings of the First International Conference on Web Services (ICWS'03), Las Vegas, Nevada, USA, Jun. 2003, pp. 203-207.*
Pahl et al., "Ontology Support for Web Service Processes," ESEC/FSE'03, Sep. 1-5, 2003, 9 pages.*
Arai et al., "Semantic Web Service Architecture Using Multi-agent Scenario Description," Lecture Notes in Computer Science, Oct. 22, 2003, pp. 98-109.*
Matthew J. Duftler, Nirmal K. Mukhi, Aleksander Slominski and Sanjiva Weerawarana, "Web Services Invocation Framework," IBM T.J. Watson Research Center, Aug. 9, 2001, pp. 1-8.*
"DAML-S: Semantic Markup for Web Services", The DAML Services Coalition, May 5, 2003, pp. 1-24.*
Kopena, "DAMLJessKB", http://plan.mcs.drexel.edu/projects/legorobots/design/software/DAMLJessKB/, Oct. 9, 2002 (printed from internet Jan. 15, 2004).
Eriksson, "JessTab: Integrating Protégé and Jess", http://www.ida.liu.se/~her/JessTab/, edited Jan. 8, 2004 (printed from internet Jan. 15, 2004).

(Continued)

*Primary Examiner*—Li B Zhen

(57) ABSTRACT

A method, system, and apparatus is disclosed for interfacing with a distributed computing service. A semantic interpretation specification can be accessed that describes a behavior used to interface with the distributed computing service. The semantic interpretation specification is entered into a rules engine. A set of procedures is obtained from the rules engine for interacting with the distributed service. An interface with the distributed computing service can be formed using the set of procedures.

21 Claims, 6 Drawing Sheets

OTHER PUBLICATIONS

Chen et al., "Dynamic-agents, Workflow and XML for E-Commerce Automation", First International Conference on E-Commerce and Web-Technology, 2000.

Grosof et al., "SweetJess: Translating DamlRuleML to Jess", Submitted to 2002 Semantic Web Conference. 2002.

* cited by examiner

METHOD AND APPARATUS FOR INTERFACING WITH A DISTRIBUTED COMPUTING SERVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates in general to data processing services, and in particular to interfacing with distributed computing services.

BACKGROUND

Lately, the emergence of what are known as "Web services" has extended the World Wide Web's capability by providing access to computational procedures over the Web. Initially, content published on the Web was in the form of static pages that were downloaded to a browser. The browser interpreted the page for display, as well as handling user input to objects such as forms or buttons. Later adaptations to Web servers include providing dynamic content on demand, although this content was still intended for access by Web browsers.

Web services allow information to be accessed in other application domains besides browsers. Web services use some of the same open and extensible formats that have made Web browsers so useful. As a result, Web services can be powerful tools usable for providing distributed data access in many application domains.

The World Wide Web consortium (W3C)'s Web Service Activity group defines a Web service as a software application identified by a Uniform Resource Identifier (URI), whose interfaces and bindings are capable of being defined, described, and discovered as Extensible Markup Language (XML) artifacts. A Web service supports direct interactions with other software agents using XML based messages exchanged via Internet-based protocols. Web services are represented by a stack of emerging standards that describe a service-oriented, application architecture, collectively providing a distributed computing paradigm having a particular focus on delivering services across the Internet.

Generally, Web services are implemented as self-contained modular applications that can be published in a ready-to-use format, located, and invoked across the World Wide Web. When a Web service is deployed, other applications and Web services can locate and invoke the deployed service. They can perform a variety of functions, ranging from simple requests to complicated business processes.

Web services are typically configured to use standard Web protocols such as Hypertext Transfer Protocol (HTTP), Extensible Markup Language (XML) and Simplified Object Access Protocol (SOAP). The HyperText Transfer Protocol (HTTP) is a generic protocol that governs the transfer of data (e.g., files) across a network. XML is a mark-up language that addresses the problem of how to identify a common syntax and semantics for the data exchanged between applications. The schema (or structure) of an XML document may be specified by a schema definition using schema definition languages such as XML Schema or Document Type Definition (DTD). SOAP (Simple Object Access Protocol), often used to support interactions among Web services, provides a way to wrap RPC (Remote Procedure Call) calls into XML messages exchanged through HTTP (HyperText Transfer Protocol) or some other transport protocol.

Web services promise to make the construction of extremely loosely-coupled distributed information systems easier by providing technology that exposes the functionality of an information system and makes it available through standard Web technologies. In some aspects however, Web services are no different than standard programmatic interfaces because of the effort needed to utilize them. The Web service interfaces must be analyzed by a person (e.g., a computer programmer) and manually integrated (e.g., coded) for integration into a data processing system. Further, when the services or the interface to the services changes, the data processing arrangement may require manual modification to prevent failure or improper behavior.

SUMMARY

A method, system, and apparatus is disclosed for interfacing with a distributed computing service. A semantic interpretation specification that describes a behavior used to interface with the distributed computing service may be accessed and entered into a rules engine. A set of procedures may be obtained from the rules engine for interacting with the distributed service, and an interface with the distributed computing service may be formed using the set of procedures.

DETAILED DESCRIPTION

Figure 1:
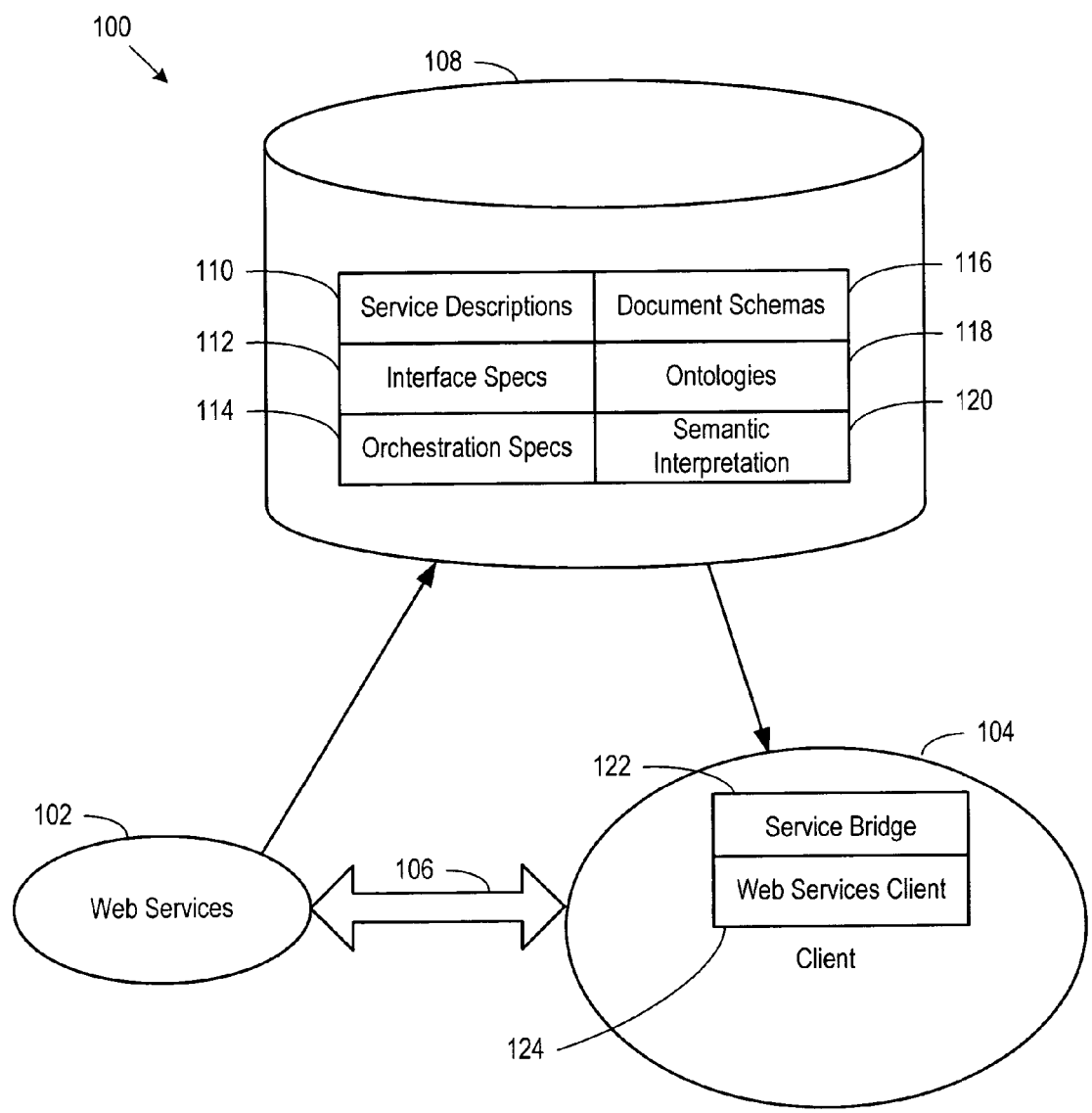
FIG. 1 illustrates an arrangement of a Web service and associated specification repository according to embodiments of the present invention.

In the following description of various embodiments, reference is made to the accompanying drawings which form a part hereof, and in which is shown by way of illustration various example manners in which the invention may be practiced. It is to be understood that other embodiments may be utilized, as structural and operational changes may be made without departing from the scope of the present invention.

In general, the present disclosure relates to providing automatic discovery of distributed computing services and automatically generating interfaces to those services. A semantic interpretation specification describes how a computing arrangement can acquire the behavior necessary to handle new types of messages that the computing arrangement may not have been not originally implemented to handle. The semantic interpretation specifications can be used with published ontologies related to messages of the service. The published ontologies provide a computing arrangement with rules for structure and vocabulary of exchanged messages with the service, and the semantic interpretation specifications provide rules for semantically handling messages composed using the ontology.

The following description uses examples of the Web services for purposes of illustration of distributed computing arrangements. It will be appreciated by those skilled in the art that the concepts described may be applied to other distributed computing arrangements, or any data processing applications where independent computing modules publish interfaces relating to methods or procedures that can be invoked via the modules.

Web services are defined by various protocols for the automatic exchange of data over the Web. The term Web services is often directed to the exchange of XML-formatted messages over the Internet to invoke remote procedure calls. It will be appreciated, however, that Web services may describe any distributed computing functionality that can be provided among networked computers. These services may use any data exchange mechanisms, such as messages, data streams, remote procedure calls, inter-process communications, etc., and the data may be exchanged in any format, such as text or binary.

Many applications that are made accessible to other applications as Web services do so through SOAP, WSDL, UDDI, and other Web standards. Common types of protocols that compose the service interaction stack include:

Transport. From the point of view of Web services, the communication network is hidden behind a transport protocol. Web services consider the use of a wide range of transport protocols, the most common one being HTTP.

Messaging. Once a transport protocol is in place, there needs to be a standard way to format and package the information to be exchanged. In Web services, this role is played by SOAP.

Protocol infrastructure (meta-protocols). E.g., the business protocols with which Web services are to comply.

Middleware (horizontal) protocols. E.g., reliability and transactions.

To invoke a particular Web service (e.g., using SOAP over HTTP), the location and document types accepted, as well as the legal sequences in which messages should be sent, must be known beforehand. Although a Web services provider can describe this information using standards such as the Web Services Description Language (WSDL) and The Web Services Flow Language (WSFL), and publish such specifications on a Web page for others to read, a more standardized and centralized system for advertisement and discovery can be used. For example, the Universal, Description, Discovery and Integration (UDDI) standard provides centralized repositories of data that provides advertisement, discovery, and description of available Web services.

WSDL is an XML-based interface definition language, and fulfills the same purpose as existing Interface Definition Languages (IDLs). In addition, it introduces a few extensions that are necessary to cope with the lack of a centralized middleware that manages transport and addressing. Through WSDL, a designer specifies the programming interface of a Web service. This interface is specified in terms of methods supported by the Web service, where each method could take one message as input and return another as output. At each site, WSDL is used like a conventional IDL. A WSDL file describing an interface can be compiled into the appropriate programming language to generate the stubs and intermediate layers that make calls to the Web services transparent. WSFL is an XML language for the description of Web Services compositions as part of a business process definition. Both WSDL and WSFL can enable specifying the types and order of messages used in invoking Web service procedures or performing other Web service interactions.

The descriptions provided by UDDI, WSDL, WSFL, and other specification standards can provide important facts about utilizing a Web service. However, these frameworks do not provide enough information to allow a program or application to discover and use the Web service without human intervention. In particular, the published specifications (e.g., WSDL descriptions) dictate the structure of the business documents involved in any particular transaction (e.g., using an XML schema description). However, current specifications do not address the semantics of the documents (e.g., that a certain field from document type 1 is equivalent to a given field from document type 2).

Ontologies help specify the semantics of document types. An ontology is a metadata schema that provides a formal, machine-processable, explicit specification of a set of terms. Ontology languages such as DAML+OIL and OWL offer standard mechanisms for structuring knowledge about entities in different domains in terms of classes, relationships, and inference rules that operate upon those classes and relationships. An ontology may define classes and class relationships, instances, slots/values, inheritance, constraints, relations between classes, and reasoning tasks.

However, even with WSDL, UDDI, and ontologies, human intervention is still required. Even if a client implements internal methods that can process and generate the documents compatible with a given Web service, a mapping between the client and service interfaces is still required. Published ontologies may allow services to specify the structure and vocabulary of the documents contained in Web service messages, but may not provide support for the exchange of methods and behaviors required to handle (e.g., interpret and produce) such messages. For example, a Web service might publish an interface that specifies that it expects the client to submit a ShippingAddress document (described by a ShippingAddress.xsd schema) at some point in the interaction. Even if the client implements an internal method that can generate a ShippingAddress document, the developer implementing the client must manually hook that method up to the interface. (That is, the service cannot automatically invoke that method from the client.) If the client implements methods that indirectly generate the document (e.g., method1 generates BillingAddress.xsd documents, and method2 converts BillingAddress.xsd documents into ShippingAddress.xsd documents), then manual intervention from the developer is even more necessary.

The need for human intervention makes Web services non-trivial to utilize. Even if the Web service can be understood and exploited by a non-technical user, an end-user application must often be programmed to interface with the Web service. A programmer is used to analyze and implement a programmatic Web service interface for the end-user application. Because this Web service interface is customized for the purposes of the end-user application, further intervention by a programmer is needed if the interface changes. Similarly, a programmer may be needed to adapt the end-user application to exploit similar Web services that have different interfaces.

In order for a client to dynamically discover and implement a Web service, the published message ontologies can be associated with specifications for semantic interpretation. These semantic interpretation specifications express rules for handling the message using the published ontology. These semantic interpretation rules can be expressed, for example, using Java Expert System Shell (JESS) rules. In a simple example, the rules can identify a programmatic interface that enables the client to handle a certain document type. In a more sophisticated embodiment, a series of rule sets can enable the client to populate fields in a document (like filling out a form).

JESS is a Java-based rule engine and scripting environment. JESS is a software tool that can be used for building expert systems. An expert system is generally defined as a rules engine for interpreting a set of rules that can be repeatedly applied to a collection of facts about the world. Once a set of facts has been entered into the expert system's knowledge base, rules that apply to the facts are executed. As a result of the executed rules, an expert system can provide deductions about the facts.

of rules, the application or service can automatically deduce a set of procedures used for interfacing with the Web services. The resultant set of procedures can be executed for interfacing with the Web service. In this way, the application or program can dynamically create and use a selected Web service interface without the need for a programmer to create that interface.

Semantic interpretation specifications can include any manner of data usable by a rules engine for describing how data is semantically exchanged with a distributed computing service. An example of a semantic interpretation specification using JESS rules is shown in Table 1. Table 1 includes a set of JESS rules that can be used to generate a particular document form during some stage of a Web services interaction. This example assumes the Web service may expect a purchaseOrder.xsd document at a given stage of an interaction. The purchaseOrder.xsd document type is associated with a PurchaseOrder ontology. The "semantic interpretation rules" will help the client map that document type to its own internal interfaces to "methods." The methods obtained can help the client produce the purchaseOrder.xsd document.

TABLE 1

```
( defrule                     WS_expects_PO_document
    ( web_service             ?current_service   )
    ( processing_stage        ?current_service  INTERMEDIATE_ACTION )
    ( document_type           purchaseOrder.xsd   )
    ( ontology                PurchaseOrderOntology )
    ( compatible_ontology PurchaseOrderOntology purchaseOrder.xsd )
=>
    ( assert ( generate_interpretation_rules PurchaseOrderOntology
                   purchaseOrder.xsd))
)
( defrule                     generate_client_mapping
    ( web_service             ?current_service   )
    ( processing_stage        ?current_service  INTERMEDIATE_ACTION )
    ( generate_interpretation_rules    ?ontology      ?docType1 )
    ( client_fact             ?method         PRODUCES  ?docType2 )
    ( discovery_service  ?serverX        EXPECTS    ?docType2 )
    ( semantic_rules         ?ontology       ?semantics )
=>
    ( generate_mapping  ?ontology      ?semantics    ?docType1 ?docType2)
)
© 2003 Hewlett-Packard Company
```

In some applications, expert systems can provide answers that would normally require a human expert, such as medical diagnosis, business decisions, etc. In the present example, the expert system approach may yield an automatically generated procedure for connecting to and utilizing an arbitrary Web service. Examples of an expert system approach for dynamically acquiring Web service behaviors may be described herein in terms of a JESS implementation, although it will be appreciated that there are a wide variety of expert system tools and rules engines that may be adapted for this use, including CLIPS(C Language Integrated Production System), ACQUIRE, C-PRS (Procedural Reasoning System in C), ECLIPSE, EXSYS, FLEX, etc. In addition, semantic interpretation rules may include user defined functions or Java methods.

An application or service may utilize semantic interpretation specifications to automatically create interfaces to Web services. The application or service can dynamically retrieve the semantic interpretation specification as a set of rules. The rules may be entered into a rules engine, such as an expert systems rules engine. By entering facts and executing the set In reference now to FIG. 1, an example Web service arrangement 100 is illustrated according to embodiments of the present invention. In the arrangement 100, a Web services provider 102 provides a Web service or other distributed computing function that can be accessed by other systems. A client 104 can potentially utilize the services of the provider 102, as represented by the data connection 106. The client 104 may be any manner of device or application, including another Web service, that is configured to access a Web service. Although the relationship illustrated in this arrangement may correspond to a typical client-server relationship, it will be appreciated that the concepts described may apply to other configurations, such as peer-to-peer and distributed processor arrangements.

The client 104 can be dynamically configured to utilize the services of the provider 102, even though the client 104 may not have been previously configured to interact with the provider 102. The provider 102 can enable dynamic interactions by publishing specifications of the service in a repository 108. The repository 108 may include any combination of data storage arrangements that can be locally or remotely accessed by the client 104 and the provider 102. The repository 108 may contain any combination of service descriptions 110 (e.g., UDDI), interface specifications 112 (e.g., WSDL), orchestrations specifications 114 (e.g., WSFL), document schemas 116 (e.g., DTD and XMLSchema), ontologies 118 (e.g., DAML+OIL), and semantic modules 120.

The client 104 can determine the various specifications of the repository 108 in order to utilize the services of the provider 102. The client 104 may utilize a service bridge 122 that determines the available services, extracts the appropriate specifications from the repository 108, and generates a procedure for utilizing the service. The procedures formed by the service bridge 122 can be used by a Web services client module 122 for carrying out the Web service transactions with the provider 102.

Figure 2:
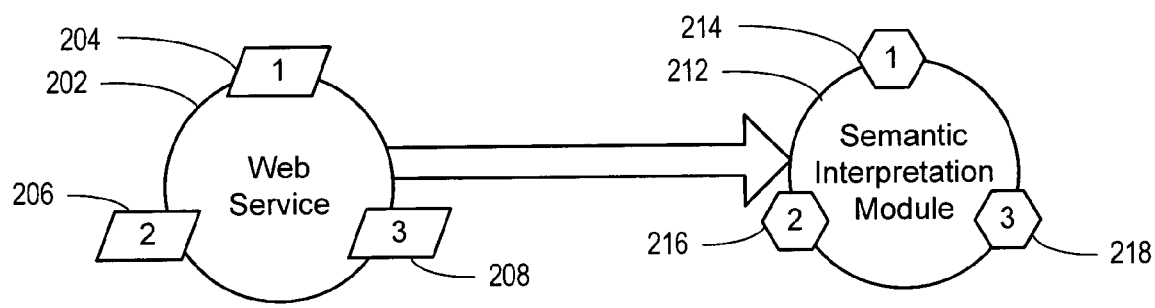
FIG. 2 illustrates a relationship between Web service interfaces and a semantic interpretation module according to embodiments of the present invention.

In general, Web service providers can formulate and publish specification data, including semantic interpretation specifications, into a commonly accessible repository. These specifications can be used to form semantic interpretation modules for interfacing with the Web services. FIG. 2 illustrates an association between a Web service 202 and semantic interpretation modules 212 according to embodiments of the present invention. The Web service 202 includes publicly accessible interfaces 204, 206, and 208. The semantic interpretation module 212 include modules 214, 216, and 218 that correspond to the Web service interfaces 204, 206, and 208, respectively.

Although the relation to interfaces 204, 206, 208 and modules 204, 206, 208 is shown as a one-to-one mapping, it will be appreciated that a single semantic interpretation module may correspond to multiple interfaces. Conversely, multiple semantic interface modules may correspond to a single interface.

Figure 3:
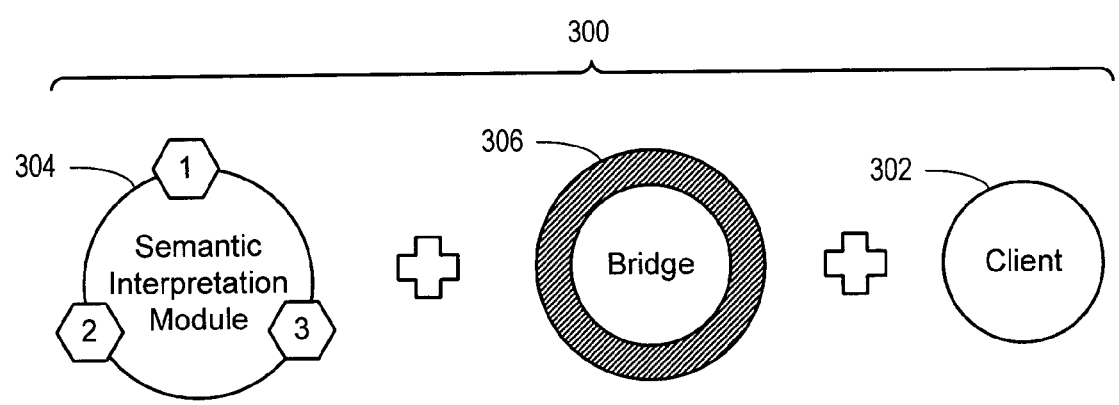
FIG. 3 illustrates a relationship of a service bridge with a client application and a semantic interpretation module according to embodiments of the present invention.

In FIG. 3, a diagram 300 illustrates how a client 302 can use the semantic interpretation module 304 according to embodiments of the present invention. The semantic interpretation module 304 may include specifications, such as a set of expert system rules, that describe aspects of a particular Web service interface. The client 302 may include a specialized interface for invoking dynamically-acquired Web service behaviors, or may include a generic interface adaptable for programmatic procedures. The generic interface can communicate with code modules (e.g., plug-ins) designed for invoking dynamically acquired Web service interfaces. The client 302 can use the semantic interpretation module 304 to form a service bridge 306 for translating generic requests of the client 302 into specific Web service requests.

Figure 4:
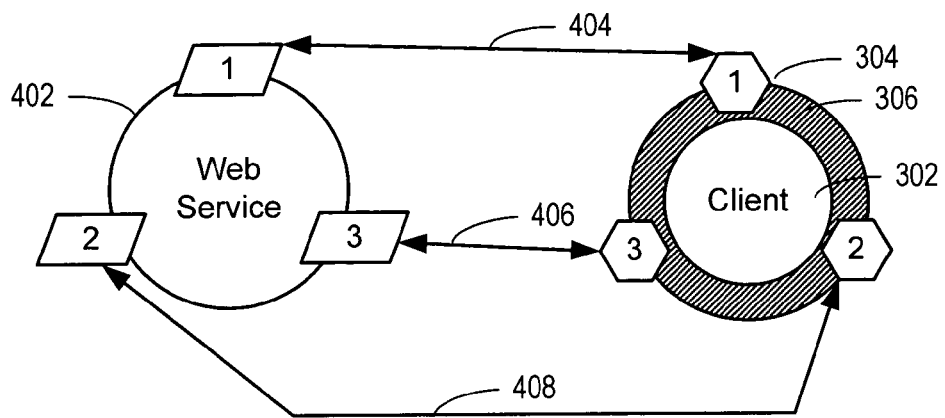
FIG. 4 illustrates a client interfacing with a Web service via a service bridge and semantic interpretation module according to embodiments of the present invention.

The use of the service bridge 306 in invoking Web services is illustrated in FIG. 4 according to embodiments of the present invention. The client 302 may build the service bridge 306 based on semantic interpretation module 304 that corresponds to semantic interpretations specifications (e.g., JESS rules) of a Web service 402. The client 302 can use the service bridge 306 to invoke specific Web service interfaces of the Web service 402, as indicated by the arrows 404, 406, 408.

The service bridge 306 can use any properly formatted semantic interpretation specification to create the client interface. Therefore, the service bridge 306 can create ad hoc interfaces to any Web service that publishes semantic interpretation specifications. Although an end-user may still have to specify what services to use and how to use the services, providing a dynamically generated service bridge 306 can free the end-user from having to build programmatic interfaces.

For example, consider a user who wants to automatically track the prices of a particular product, including bulk discounts and shipping costs. There may be a dozen different vendors that provide this data via a Web service, with some or all of the vendors using different interfaces. It is likely that at least some of the interfaces require different data formats, and some may even use different Web service protocols (e.g., SOAP versus XML-RPC). In addition, some of the transactional behaviors required to reach the end goal (e.g. the price) may differ as well. For example, some interfaces may require all price queries be processed using the vendor's unique ID. Therefore the transactions may require first converting an industry part number to a vendor ID number via the Web service interface before proceeding to the price query.

When using a system that makes use of a service bridge 306 and semantic interpretation modules 304, the user may only need to form a generalized query (part number, quantity, delivery, etc.). The user can find and select Web services that can fill this type of query through a mechanism such as UDDI. The service bridge 306 can then discover all the necessary behaviors and implement a handler associated with each vendor for processing these queries. In this way, the user can take advantage of multiple Web services with only a high-level knowledge about the services and without a large amount of programming overhead. In addition, the service bridge 306 can be configured to discover and adapt to changes in the Web service interfaces. Therefore, the user's application is less prone to break due to the inevitable interface modifications that occur over time.

Figure 5:
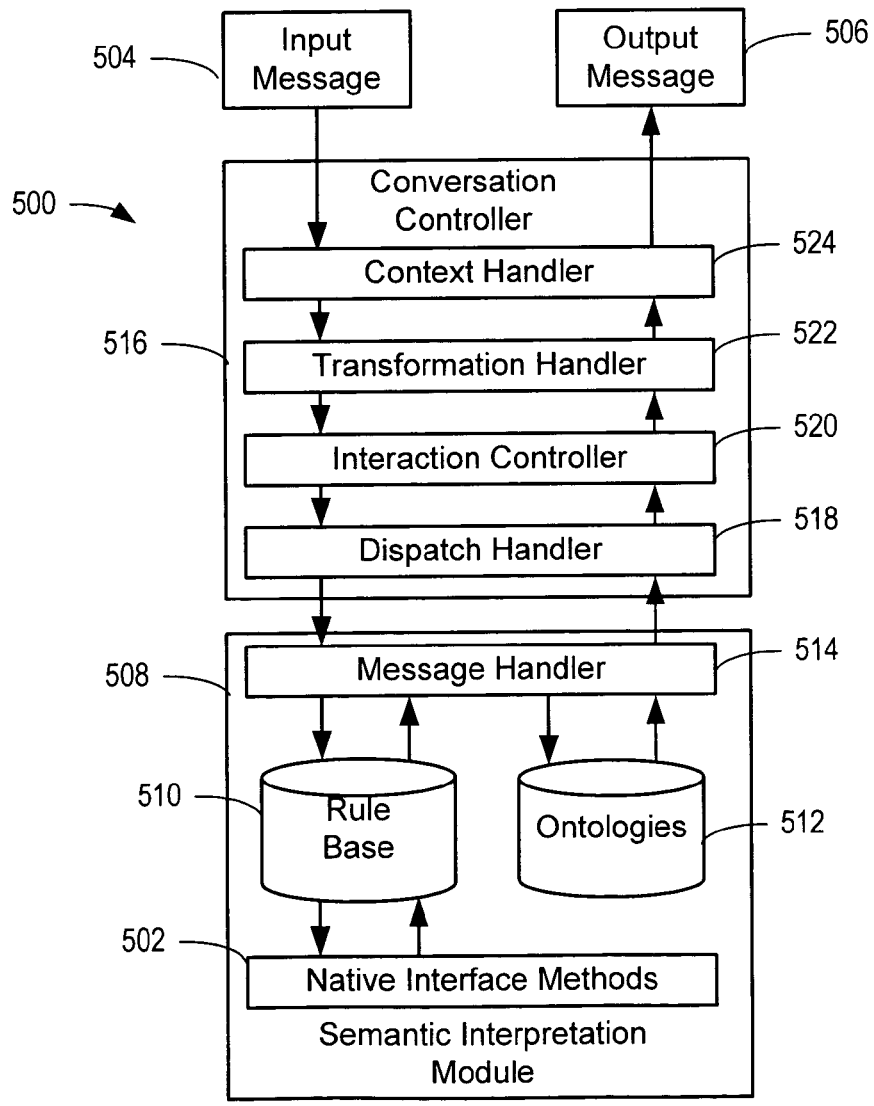
FIG. 5 illustrates a service bridge architecture according to embodiments of the present invention.

An example arrangement of how a service bridge 500 may be implemented according to embodiments of the present invention is illustrated in FIG. 5. The service bridge 500 can act as an intermediary between a native interface 502 and input/output messages 504, 506 used to invoke Web services. The native interface 502 may be specific to Web service invocation or may be a generic method interface, such as a plug-in interface. A semantic interpretation module 508 receives methods from the native interface 502 and can use a rule base 510 for translating these methods into Web service interface procedures. An ontologies database 512 can be used for correctly forming outgoing messages 506 and interpreting incoming messages 504. The rule base 510 and ontologies database 512 can interface with a message handler 514 for sequencing and queuing messages.

The service bridge 500 may include a conversation controller 516 that controls various details of the Web service conversations for the semantic interpretation module 508. The conversation controller 516 includes a context handler 524 for determining associations between current Web service conversations and incoming messages 504. A transformation handler 522 deals with transforming message types from one document type (e.g., XML schema) to another, depending on the requirements of the Web service conversation and the native interface 502. An interaction controller 520 is used for determining the correct states of the Web service conversations and whether message types are correct for current state. A dispatch handler 518 is used for queuing and dispatching messages between the conversation controller 516 and the semantic interpretation module 508.

Figure 6:
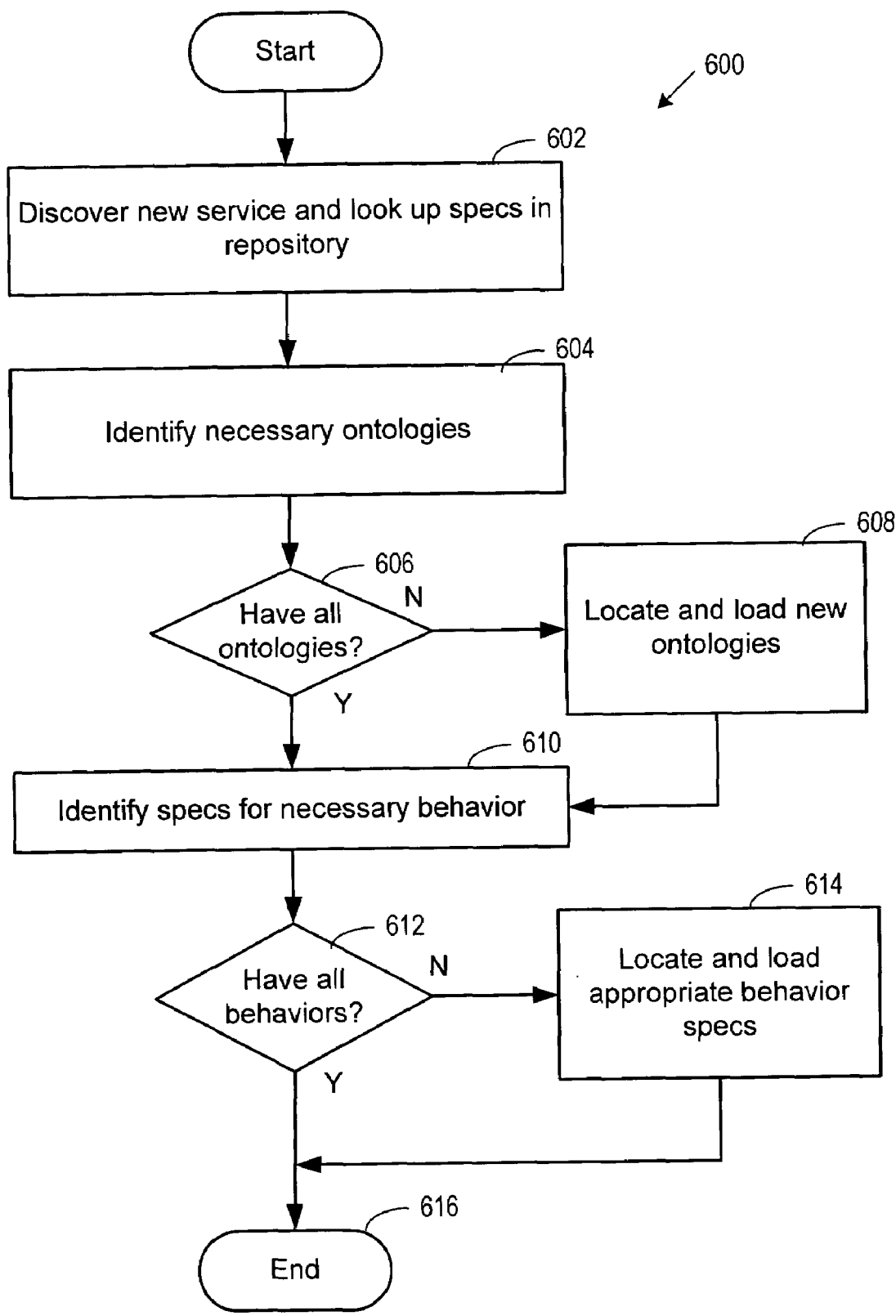
FIG. 6 is a flowchart illustrating procedures of obtaining ontologies and behavior specifications according to embodiments of the present invention.

In reference now to FIG. 6, a flowchart 600 details how a service bridge may discover and employ specifications for a new Web service interface according to embodiments of the present invention. The procedure begins by discovering a new Web service and looking up specifications for the service in a repository (602). The specifications can be used to identify (604) which ontologies are required to implement the service. A local repository or some other data store may be checked (606) to see if required ontologies are currently available. If the ontologies are not available, then they can be located and loaded (608).

After the ontologies have been loaded (608), the behavior specifications can be identified (610). A check (612) is made to see if the behavior specifications are available locally, and if not the behavior specifications can be located and loaded (614). The routine can successfully exit (616) once all the required specifications are loaded. After completing this procedure 600, a service bridge has the necessary information to implement an interface for dealing with Web service messages.

Figure 7:
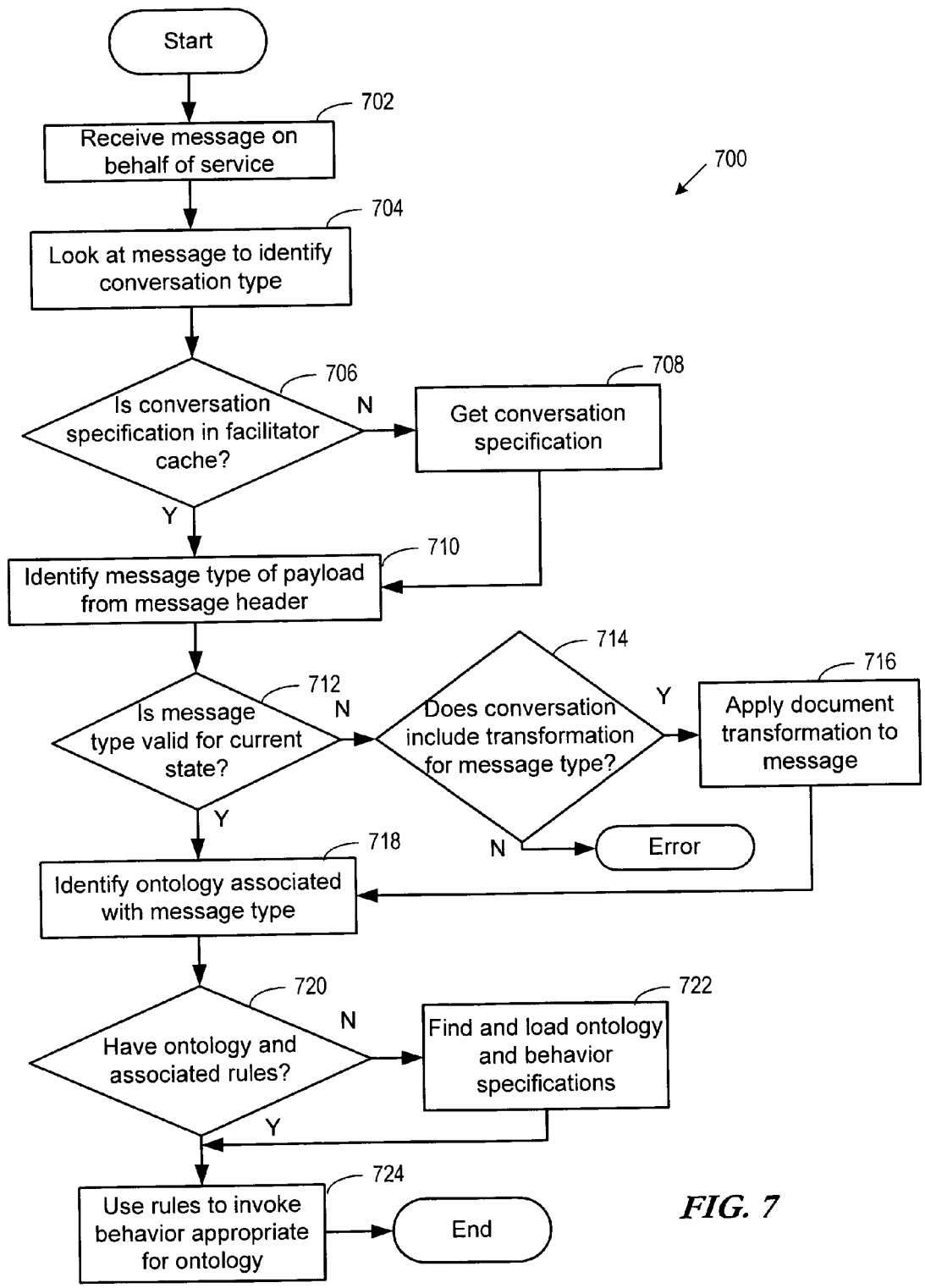
FIG. 7 is a flowchart illustrating procedures of interfacing with a Web service using a service bridge module according to embodiments of the present invention.

In FIG. 7, a flowchart 700 illustrates how a service bridge may process Web service messages according to embodiments of the present invention. An incoming message is received (702) and the conversation type is identified (704). The specification of the identified conversation type is checked (706) to see if it is in a local cache. If the conversation specification is not locally cached, it can be loaded (708) from a repository.

The incoming message may contain a document in the message body (e.g., a SOAP envelope). This document defines the message type, and the message type may be identified (710) by looking at the message header. The document type is checked (712) for validity given the current state of the conversation. If the message type is not valid, the specifications may be checked (714) to see if a conversation specification includes a transformation to convert the message to the correct type. If so, the transformation is applied (716) to the message.

After the validity of the message type has been confirmed, the ontology associated with the message type is identified (718). A data store may be checked (720) to ensure the ontology and associated behavior rules are loaded and current, and that information can be loaded (722) if not. The ontology and rules can then be used to invoke (724) the appropriate behavior.

Figure 8:
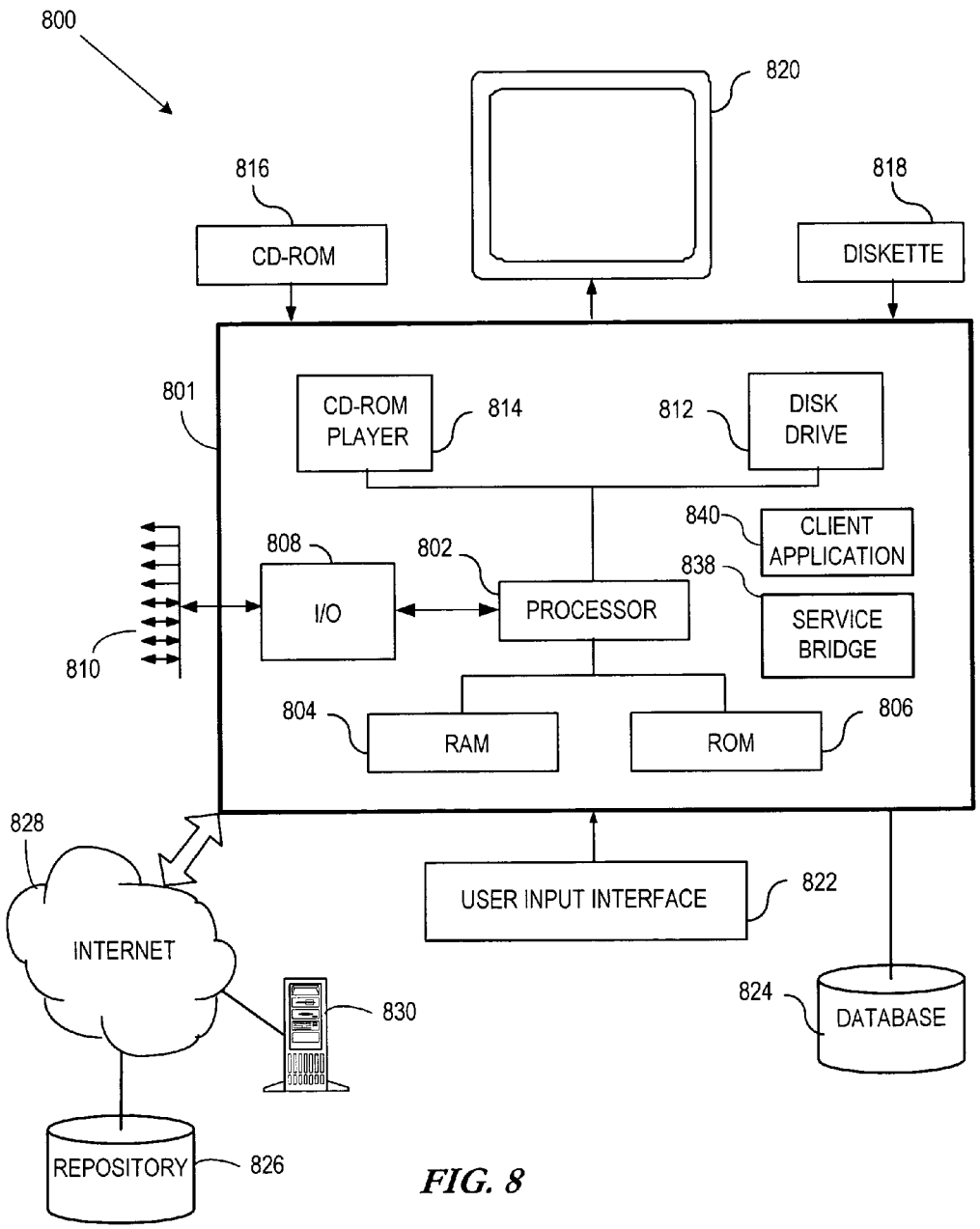
FIG. 8 is a diagram of a data processing structure suitable for accessing Web services via a service bridge according to embodiments of the present invention.

It will be appreciated that any manner of data processing arrangements capable of processing and communicating digital information may be used for dynamically acquiring and using Web service interfaces as described herein. Data processing arrangements may include any combination of hardware, firmware, software or a combination thereof. An example of a computing structure 800 suitable of carrying out operations in accordance with embodiments of the present invention is illustrated in FIG. 8.

The example computing structure 800 includes a data processing arrangement 801. The computing arrangement 801 may perform as any combination of a server, client, gateway, proxy, or any other network entity used for processing Web service messages. The computing arrangement 801 includes at least one central processor (CPU) 802 coupled to random access memory (RAM) 804 and read-only memory (ROM) 806. The ROM 806 may also be other types of storage media to store programs, such as programmable ROM (PROM), erasable PROM (EPROM), etc.

The processor 802 may communicate with memory and other internal and external components through input/output (I/O) circuitry 808 and bussing 810, to provide control signals and the like. For example, a service bridge module 838 may contain instructions for discovering and retrieving semantic interpretation specifications via the I/O 808 and bussing 810 (e.g., through a network interface hardware and associated drivers). The service bridge module 838 may provide a dynamically configurable Web service interface for use by a client application 840 or other software processes.

External data storage devices, such as a database 824, used for storing Web service specifications, may be coupled to I/O circuitry 808 or via local networks to facilitate Web service functions according to the present invention. Alternatively, such specifications may be locally stored in the storage/memory of the computing arrangement 801, or may be stored on a repository 826 accessible via networks having a more extensive reach such as the Internet 828. The computing arrangement may invoke ad hoc Web service conversations via the service bridge module 838 with any manner of Web service provider, such as a server 830.

The computing arrangement 801 may also include one or more data storage devices, including hard and floppy disk drives 812, CD-ROM drives 814, and other hardware capable of reading and/or storing information such as DVD, etc. Software for carrying out Web service interactions as described herein may be stored and distributed on a CD-ROM 816, diskette 818 or other form of media capable of portably storing information. These storage media may be inserted into, and read by, devices such as the CD-ROM drive 814, the disk drive 812, etc.

The software may also be transmitted to computing arrangement 801 via data signals, such as being downloaded electronically via a network, such as the Internet 828. The computing arrangement 801 may be coupled to a display 820, which may be any type of known display or presentation screen, such as LCD displays, plasma display, cathode ray tubes (CRT), etc. A user-input interface 822 may be provided, including one or more user interface mechanisms such as a mouse, keyboard, microphone, touch pad, touch screen, voice-recognition system, etc.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-implemented method for interfacing with a distributed computing service, comprising:

accessing an ontology specification describing messages of the distributed computing service;

accessing a semantic interpretation specification that describes rules for semantically handling the messages, as specified in the ontology specification, with the distributed computing service;

entering the semantic interpretation specification into a rules engine adapted for providing processor executable procedures;

obtaining a set of procedures from the rules engine for interacting with the distributed service based on the semantic interpretation specification;

receiving a request for interfacing with the distributed service; and interfacing with the distributed computing service using the set of procedures in response to the request, wherein the interfacing comprises forming distributed computing service messages based on the ontology specification and forming a service bridge having a generic programmatic interface adapted to receive the request.

2. The method of claim 1, wherein the distributed computing service comprises a Web service.

3. The method of claim 1, wherein the semantic interpretation specification comprises an expert system interpretable specification.

4. The method of claim 3, wherein the semantic interpretation specification comprises rules usable with a rule-based expert system.

5. An apparatus, comprising:
a data transfer interface for providing data connections to a distributed computing service; and
a processor arranged to
access an ontology specification describing messages of the distributed computing service;
access a semantic interpretation specification that describes rules for semantically handling the messages, as specified in the ontology specification, used to interface with the distributed computing service;
enter the semantic interpretation specification into a rules engine adapted for providing processor executable procedures;
obtain a set of procedures from the rules engine for interacting with the data transfer service based on the semantic interpretation specification;
interface with the distributed computing service via the data transfer interface using the set of procedures, wherein the interfacing includes forming distributed computing service messages based on the ontology specification; and
a memory to store a service bridge module operable via the processor to activate the set of procedures based on instructions from a generic programmatic interface of the service bridge module.

6. The apparatus of claim 5, wherein the data transfer interface comprises a network interface.

7. The apparatus of claim 6, wherein the distributed computing service comprises a Web service.

8. The apparatus of claim 6, wherein the semantic interpretation specification comprises an expert system interpretable specification.

9. The apparatus of claim 8, wherein the expert system rules comprise rules usable with a rule-based expert system.

10. A computer-readable storage medium configured with instructions for causing a processor to perform steps comprising:
accessing an ontology specification describing messages of the distributed computing service;
accessing a semantic interpretation specification describing rules for semantically handling the messages, as specified in the ontology specification, with a distributed computing service;
entering the semantic interpretation specification into a rules engine adapted for providing processor executable procedures;
obtaining a set of procedures from the rules engine for interacting with the distributed service based on the semantic interpretation specification;
receiving a request for interfacing with the distributed service; and
interfacing with the distributed computing service using the set of procedures in response to the request, wherein the interfacing comprises forming distributed computing service messages based on the ontology specification and forming a service bridge having a generic programmatic interface usable to execute the set of procedures.

11. The computer-readable storage medium of claim 10, wherein the distributed computing service comprises a Web service.

12. The computer-readable storage medium of claim 10, wherein the semantic interpretation specification comprises an expert system interpretable specification.

13. The computer-readable storage medium of claim 12, wherein the semantic interpretation specification comprises rules usable by a rule-based expert system.

14. A system comprising:
means for providing a distributed computing service;
means for storing an ontology specification describing messages of the distributed computing service;
means for storing a semantic interpretation specification that describes rules for semantically handling the messages, as specified in the ontology specification, used to interface with the distributed computing service;
means for accessing the semantic interpretation specification for entry into a rules engine adapted for providing processor executable procedures;
means for accessing an ontology describing messages of the distributed computing service;
means for obtaining a set of procedures from the rules engine for interacting with the distributed service based on the semantic interpretation specification; and
means for forming distributed computing service messages based on the ontology for use in the set of procedures; and
means for interfacing with the distributed computing service using the set of procedures, comprising means for forming a service bridge having a generic programmatic interface usable to execute the set of procedures.

15. A method of interfacing with a distributed computing service comprising:
receiving a message from the distributed computing service;
identifying a message type of the message for processing of the message;
accessing an ontology specification describing the message type;
accessing a semantic interpretation specification describing rules for semantically handling the messages, as specified in the ontology specification, with the distributed computing service based on the message type;
entering the semantic interpretation specification into a rules engine adapted for providing processor executable procedures;
obtaining a set of procedures from the rules engine for interacting with the distributed service based on the semantic interpretation specification; and
interfacing with the distributed computing service using the set of procedures in response to the message, wherein the interfacing comprises forming a distributed computing service message based on the ontology specifications, outputting the message, and forming a service bridge module having a generic programmatic interface usable to execute the set of procedures.

16. The method of claim 15, wherein the distributed computing service comprises a Web service.

17. The method of claim 15, wherein the semantic interpretation specification comprises expert system rules.

18. A system comprising:
a first data processing arrangement configured to provide a distributed computing service;
a data storage arrangement containing an ontology specification and a semantic interpretation specification, wherein the ontology specification describes messages of the distributed computing service, and the semantic interpretation specification describes rules for semantically handling the messages, as specified in the ontology specification, used to interface with the distributed computing service;

a second data processing arrangement having a rules engine adapted for providing processor executable procedures, the second data processing arrangement configured to:

receive a request to interface with the distributed computing service;

accessing the ontology specification from the data storage arrangement;

access the semantic interpretation specification from the data storage arrangement;

enter the semantic interpretation specification into the rules engine;

obtain a set of procedures from the rules engine for interacting with the distributed service based on the semantic interpretation specification; and interface with the distributed computing service using the set of procedures, wherein the interfacing includes forming distributed computing service messages based on the ontology specification and forming a service bridge having a generic programmatic interface adapted to receive the request.

19. The system of claim 18, wherein the distributed computing service comprises a Web service.

20. The system of claim 18, wherein the a data storage arrangement is adapted for providing the semantic interpretation specification via a network.

21. The system of claim 18, wherein the semantic interpretation specification comprises expert system rules.

* * * * *

UNITED STATES PATENT AND TRADEMARK OFFICE
CERTIFICATE OF CORRECTION

PATENT NO. : 7,607,136 B2  Page 1 of 1
APPLICATION NO. : 10/695461
DATED : October 20, 2009
INVENTOR(S) : Harumi Anne Kuno et al.

It is certified that error appears in the above-identified patent and that said Letters Patent is hereby corrected as shown below:

In column 11, line 12, in Claim 5, after "to" insert -- : --.

In column 14, line 12, in Claim 20, after "the" delete "a".

Signed and Sealed this

Thirteenth Day of July, 2010

David J. Kappos
*Director of the United States Patent and Trademark Office*